E. F. BROOKS.
Automatic Lubricating Water and Gas Cocks.

No. 144,735.  Patented Nov. 18, 1873.

Witnesses:
G. Mathys
Solon C. Kemon

Inventor:
Edwin F. Brooks
Per
Attorneys.

UNITED STATES PATENT OFFICE.

EDWIN F. BROOKS, OF BALTIMORE, MARYLAND, ASSIGNOR TO HIMSELF AND CHARLES E. SEAL, OF WINCHESTER, VIRGINIA.

IMPROVEMENT IN AUTOMATIC LUBRICATING WATER AND GAS COCKS.

Specification forming part of Letters Patent No. 144,735, dated November 18, 1873; application filed October 8, 1873.

*To all whom it may concern:*

Be it known that I, EDWIN F. BROOKS, of Baltimore city and State of Maryland, have invented a new and Improved Automatic Lubricating Water and Gas Cock; and I do hereby declare that the following is a full, clear, and exact description of the same, reference being had to the accompanying drawing forming a part of this specification.

The invention relates to means whereby the valve of a water or gas cock may be conveniently lubricated and turned. It will first be fully described, and then clearly pointed out in the claims.

Figure 1:
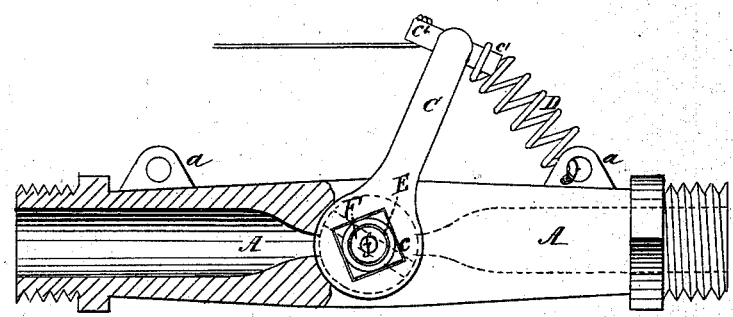
Figure 2:
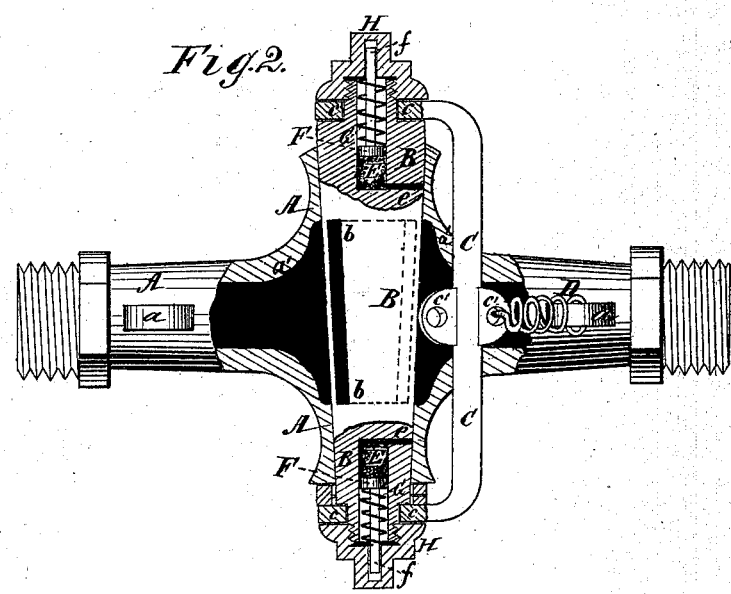

Figure 1 is a side elevation, showing the device for closing the valve. Fig. 2 is a longitudinal section of the valve, illustrative of the mode of lubricating it.

A represents the shell of a water or gas cock, provided with a vibratory valve, B, having the longitudinal slot *b*.

Ordinarily, these valves are slotted, so as to require the vibration to extend over a considerable arc. To this, in practice, there are grounds of objection, which are overcome by my narrow longitudinal slots in valve and shell. The ordinary slot, having only the inner diameter of the shell A, in order to present a passage of cross-sectional area equal to that of the cock-inlet, is necessarily made wide and short. This compels the valve to be moved over a comparatively large arc, so as to cover the slot. By curving the inside of shell at *a′ a′*, I form a chamber on each side of the slot of valve that will admit of the free exit through the cock of the volume of liquid that enters the shell, while the arc of vibration is greatly reduced.

C is a yoke, having angular or square apertures *c c*, that fit over the ends of valves, so that when one is turned the other must be carried with it, and also having apertured side lugs *c′ c′*. To one of the latter, and to a lug, *a*, on shell, is attached a spiral spring, D, that always closes the valve, and keeps it closed when not overcome by a force greater than its tension. To the other lug is attached some connection, whereby it may be conveniently manipulated. As these valves have so large an extent of bearing-surface, or surface in contact with that of shell, they are very liable to stick, and fail to work properly. In order to overcome this, I make a reservoir, E, in one or both ends of valve B, and in this locate a fluid lubricant, or some spongy substance saturated therewith. This is connected, by hole or holes *e*, with the outer surface of valve. In the reservoir is inserted a piston, F, having the rod *f*, extending outwardly, and provided with a circumjacent spiral spring, G. The screw-cap H is then made to receive the end of rod *f*, and act as a guide thereto, while, as it is forced down on the spring, the piston exercises a constant pressure on the lubricant, forcing it through holes *e*, and allowing it to permeate the space between the shell and valve.

By this last device the valve will always work easily and smoothly; by the elongated slot it will be required to move over a very small arc, and by the spring-yoke it will always be closed automatically.

Having thus described my invention, what I claim as new, and desire to secure by Letters Patent, is—

1. A gas or water cock valve constructed with an oil-reservoir, E, in one or both ends, connected with the outer surface of valve by a hole or holes, *e*, as and for the purpose specified.

2. The means for forcing the lubricant from reservoir, through hole or holes *e*, and between the valve and shell, consisting of the piston and rod F *f*, spring G, and screw-cap H, applied in the manner described.

The above specification of my invention signed by me this 29th day of September, A. D. 1873.

EDWIN F. BROOKS.

Witnesses:
SOLON C. KEMON,
CHAS. A. PETTIT.